L. C. Rodier,
Slide Valve.
No. 106,727.  Patented Aug. 23, 1870.
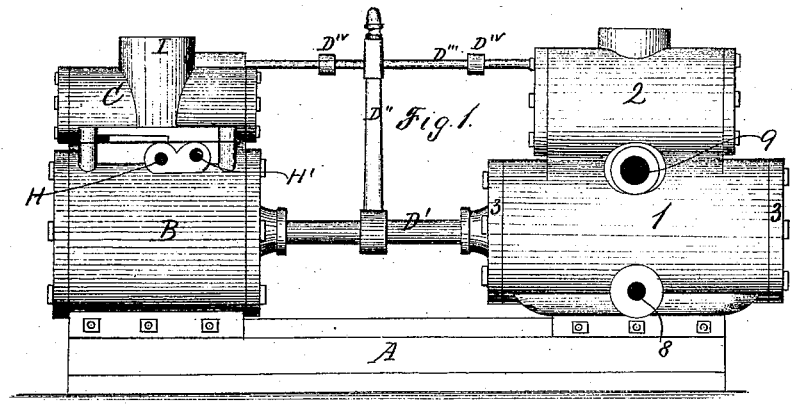
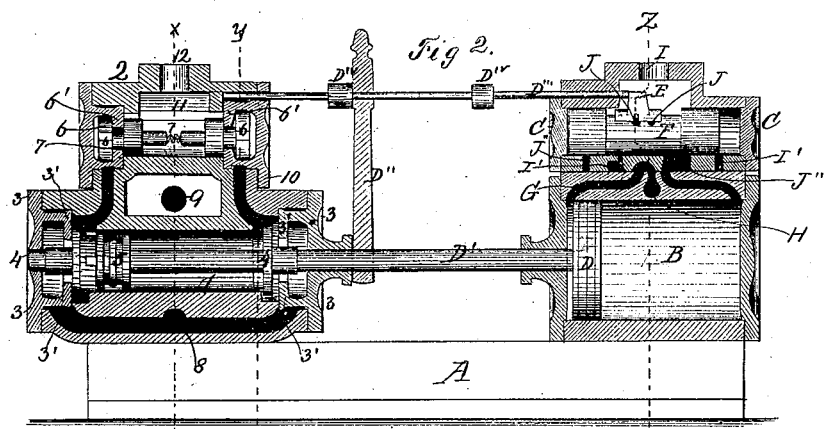
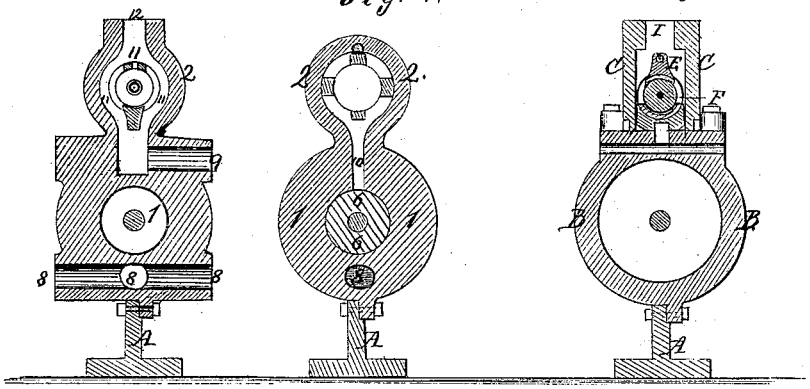
Witnesses:
J. Ruppert
Aedw Keils
L. C. Rodier
Inventor
D. P. Holloway & Co
Attys L. C. Rodier,
Slide Valve.
No. 106,727.   Patented Aug. 23, 1870.
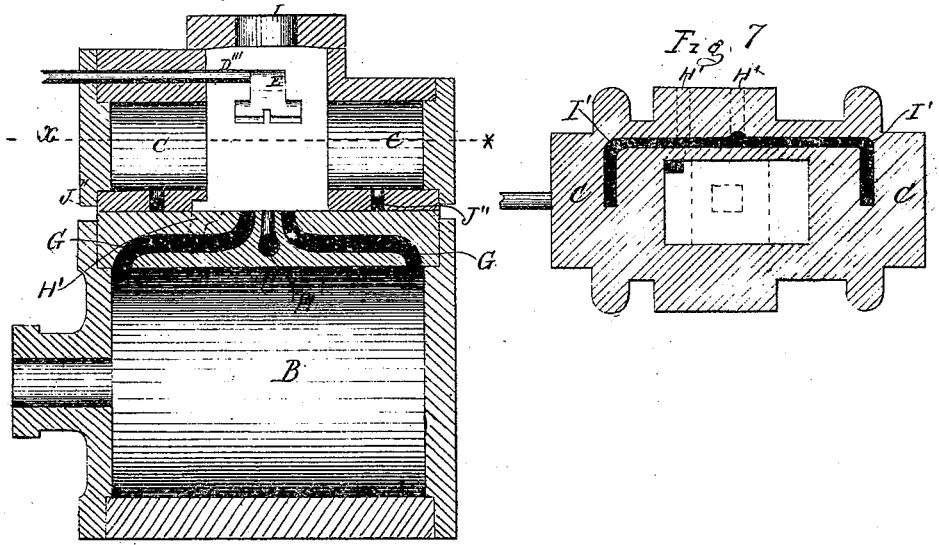
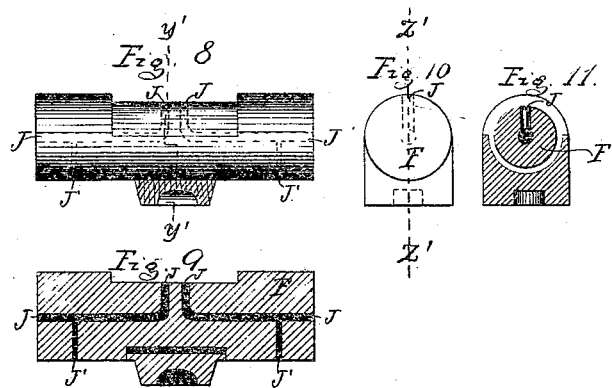
Attest
J. Ruppert
C. Edw. J. Eils
L. C. Rodier
Inventor
D. P. Holloway & Co
Atty

UNITED STATES PATENT OFFICE.

LOUIS C. RODIER, OF SPRINGFIELD, MASSACHUSETTS.

IMPROVEMENT IN PUMPING-ENGINE.

Specification forming part of Letters Patent No. 106,727, dated August 23, 1870.

*To all whom it may concern:*

Be it known that I, LOUIS C. RODIER, of Springfield, in the county of Hampden and State of Massachusetts, have invented certain Improvements in Pumping-Engines; and I do hereby declare that the following is a full, clear, and exact description thereof, reference being had to the annexed drawing, making part of this specification, in which—

Figure 1 is a side elevation of my improved engine, showing the steam and water cylinders, their valve-chests, the piston-rod which connects the pistons of both cylinders, the tappet on the piston-rod, the valve-rod, and its adjustable abutments against which the tappet strikes. Fig. 2 is a vertical central section of the steam-cylinder, its valves, steam-passages, and piston, and of the water-cylinder, with its valves and piston, and its induction and eduction passages, and the arrangement of devices for operating the steam induction and eduction valves. Fig. 3 is a transverse vertical section on line *x x* of Fig. 2, showing the induction and eduction water-passages, and the aperture through which they and the cylinder of the pump communicate with the air-chamber. Fig. 4 is a transverse vertical section on line *y y* of Fig. 2, showing the passage between the main cylinder and the valve-cylinder, and the method of attaching said main cylinder to the frame. Fig. 5 is a transverse vertical section on line *z z* of Fig. 2, showing the steam-induction passage, the induction and eduction valves, the manner of attaching the valve-chest to the cylinder, and the cylinder to the frame upon which it rests. Fig. 6 is a longitudinal central section of the steam-cylinder and steam or valve chest, showing the induction and eduction steam-passages and the induction-valve. Fig. 7 is a section on line *x' x'* of Fig. 6, showing the steam-passages which are formed in it. Fig. 8 is an elevation of the eduction steam-valve, showing the passages through which the steam passes to move it, and through which the water of condensation is discharged from the cylinder in which it works. Fig. 9 is a central sectional elevation of the same valve, showing its steam-passages and its escape or exhaust aperture. Fig. 10 is an end view of the same. Fig. 11 is a transverse section on line *y' y'* of Fig. 8, showing the steam-space around the body of the valve.

Corresponding letters refer to corresponding parts in the several figures.

This invention relates to that class of engines which is provided with two cylinders, one for the use of steam as a motive power, and the other for raising water, such engines being usually designated as "pumping-engines."

The invention consists in a novel construction of some of the parts thereof, and in the combination and arrangement of them with, and with reference to, other and well-known parts of such engines; and, further, in the combination of parts which have heretofore been used in a novel and useful form; and, further, in the method of attaching the cylinder to the frame, as will be more fully described hereinafter.

To enable those skilled in the art to make and use my invention, I will proceed to describe its construction and operation.

A in the drawing refers to the frame of the engine. It is in the form of the letter T when inverted, as is clearly shown in the drawing. The vertically-projecting portion of the frame is to be of such height as to admit of a flange, which is formed upon the lower surface of both the steam and water cylinders, being bolted to it, it having first been planed or otherwise straightened upon its upper surface, and upon so much of one of its sides as to enable it to receive upon such surface the dressed surface of the flanges above referred to.

B refers to the steam-cylinder, which is or may be of any approved form of construction, and of any diameter of bore and length of stroke required. It is to be provided with heads, and with the usual seat, upon which to place the steam or valve chest, and with the usual induction and eduction passages.

Upon the lower surface of this cylinder there is to be placed a flange, which projects downward for a distance sufficient to admit of its being firmly bolted to the upwardly-projecting portion of the frame A.

The water-cylinder, hereafter to be described in other respects, has a flange of the same kind and for the same purpose upon its lower surface, the object being to enable the constructor to pass a mandrel through both cylinders, having heads upon it which shall fit each, and then place both upon a planing-machine, and plane both of the flanges at the same time, so that when the cylinders are placed upon the previously-planed portion of the frame the bores of such cylinders shall be in a parallel line; or, in other words, so that a line drawn through the centers of the cylinders shall be at an equal distance from all parts of the interior of the cylinders respectively.

By adopting this method of constructing the cylinders, the constructor is enabled to place the same upon the frame and bolt them in their positions with the certainty that, when the continuous piston-rod, with its two pistons, is placed therein, all the parts will be in line, and that they will move through the cylinders without undue friction.

C refers to the steam or valve chest, which is to be bolted to the upper face of the cylinder, it being provided with a cylindrical aperture longitudinally for the reception of a cylindrical valve, and with heads to close its ends in the usual manner. Upon the upper surface of this chest there is to be formed a projection, to which to attach the induction-pipe, and for the valve-rod to pass through.

D refers to the piston of the main or steam cylinder, it being secured upon one end of piston-rod $D^1$, as shown in Fig. 2 of the drawing.

E refers to a slide-valve, which is operated by means of stops or abutments $D^4$, placed adjustably on its rod, and so arranged that, as the piston-rod $D^1$ moves in either direction from its central position, the tappet $D^2$, attached thereto, shall come in contact with said stops or abutments, and thus change the position of the valve E with reference to the apertures in the eduction-valve, the valve E having a slot formed in its face for admitting steam to the valve F, as shown in Figs. 2 and 3.

F refers to the eduction-valve just alluded to, it being in the form of a cylinder, with a portion of its upper surface cut away, to permit the valve E to slide in such recess, and with a projection upon its under surface, in which is formed the cavity through which the steam passes in being exhausted from the main steam-cylinder.

In Figs. 8, 9, 10, and 11 the construction of this valve is shown, upon referring to which it will be seen that it is provided with apertures J J, which, starting from a point upon its upper surface, over which the slide-valve E moves, extends downward to near the center of the cylinder, where they are curved outward, from which point they extend to and open upon the ends of said cylinder, as shown in Figs. 8 and 9. The office of these apertures or passages is to admit steam alternate to the cylinder or chest C in obedience to the movements of the slide-valve E.

Communicating with and extending from the passages J J, at the proper distance from the outer ends thereof, are other passages, J' J', which extend downward therefrom, and open upon the under surface thereof, their office being to permit the discharge of steam and of the water of condensation through the apertures or passages J" J" in the steam or valve-chest C into the exhaust-port H'.

The arrangement of the valves E and F with reference to the mechanism which operates them, and to the passages for steam which they control, is such that as steam is admitted to the steam-chest C through the passage I it fills the cavity in such chest and in the upper surface of the valve F, and presses the valve E down upon F, so as to form a steam-tight joint between their surfaces.

If we suppose the parts to be in the position shown in Fig. 2, steam will enter the passage J in the left-hand end of valve F through the groove or slot formed in the face of valve E, the effect of which will be to move the valve F to the right until the exhaust-cavity in its face registers with the steam-passage G in the right-hand end of cylinder B, at which time the left-hand edge of the valve-seat upon F will have passed the edge of port G in the left-hand end of the cylinder B, and steam will enter through the same to the main cylinder, which will cause its piston to be moved to the right-hand end of said cylinder.

Before the piston has completed its movement in the direction named, the tappet D" upon piston-rod D' will come in contact with stops or abutments $D^4$ upon valve-rod $D^3$, and the valve E will be shifted over the opposite passage in valve F, which will cause said valve to be moved to its original position by the steam, which will pass through the aperture or passage J upon its right-hand end, which movement will permit the steam to pass out of the main cylinder and flow into its opposite end.

During the movements of the valve F its ends pass over the apertures J" J", and thus permit the steam which has been employed in moving it to pass through them into the exhaust-passage H', together with any water of condensation which may have accumulated therein.

It will be observed that, as a consequence of the combined movement of the two valves E and F, the induction-passages J J are opened and closed twice during each stroke of the main piston, which arrangement insures the retention of the valve F in its proper position, notwithstanding any tendency there may be to move the same at the wrong time by the passage of the valve E on its upper surface. It also serves the purpose of always having a sufficient quantity of steam in the chest or cylinder C to cushion the valve F upon its return stroke. The range of motion of this valve F may be controlled by the admission of steam to the cylinder or chest C, as above intimated; or it may be done by stops placed in such cylinder, or by its coming in contact with the valve E.

In direct-acting engines, especially in those used for pumping water, where the induction steam-valve has to be changed at a time when the greatest amount of compression, and, consequently, the greatest amount of resistance, occurs, it is found to be very difficult to cause the piston to travel far enough after the valve commences to move to complete its movement, and thus permit the steam to pass out of the main cylinder at one end and in at the other without causing it to stop and remain fixed in its position, and hence the necessity of providing a valve which shall have a greater range of motion than can be imparted to it by the piston-rod or a tappet attached thereto; and hence, also, the necessity of so arranging the parts that the amount of movement necessary to be imparted to the induction-valve, or the one moved by the main engine, shall be reduced to a minimum, as in the present case.

H refers to the exhaust-port for the main cylinder, it being formed in the upper surface thereof, in the usual or any convenient manner, as shown in Fig. 1; and H' to the exhaust-passage for the cylinder C in the valve-chest.

The numeral 1 in the drawing refers to water-cylinder, the length of which is such that the stroke of its piston is the same as that of the steam cylinder or piston which drives it. This cylinder is to be provided with proper induction-passages, as shown in the drawing, and with heads of peculiar construction.

2 refers to a valve-chest, which is secured to the upper surface of the cylinder by being bolted thereto, or by being cast thereon. This chest is cylindrical in its general outline, and is provided with heads, upon which the eduction-valves are seated.

3 refers to the heads of the cylinder, which are made to extend some distance into said cylinder, and have recesses or chambers formed in them, with which the induction water-passages communicate. Upon the inner side of this chamber, and constituting a part thereof, is an inwardly-projecting flange or disk, 3', having an aperture through its center for the passage of the piston-rod and hub of the valve. The inner surface of this disk or flange constitutes the seat of the induction-valve, as shown in Fig. 2.

4 4 refer to the induction-valves, which consist of disks of metal, having upon their outer surfaces hubs or bosses, and apertures through their centers. The valve in that end of the cylinder which is nearest to the steam-cylinder is to be fitted to and slide freely upon the piston-rod, so that its movements may be independent of such rod, except in so far as it acts as a guide to such valve. The valve in the opposite end of the cylinder is the same in its construction as the one above referred to; but as the piston in this case does not extend through the cylinder, a stem or stud is made to project from the cylinder-head inward, which serves as a guide to the valve, and keeps it in position.

5 refers to the piston, which may be of any approved form of construction, and may have apertures through its heads for the admission of water under the packing-rings, so that, as the piston moves from one end of the cylinder to the other, the packing shall be set out against the inner surface of the cylinder with a force proportionate to the resistance of the water, and, consequently, proportionate to the tendency it has to pass around such packing.

6 6 refer to the eduction-valves, which are placed in the chest 2, its heads extending therein and forming seats for said valves, as in the case of the main water-cylinder. It is apparent, however, that these valves may be arranged vertically upon the ends of the chest, if preferred, and yet be the same in principle, and without departing from my invention. These valves are constructed in all respects like those above described, except that the apertures in their centers do not extend through them, but only far enough therein to receive and hold the spring 7, which aids in keeping the valves pressed out against their seats.

8 refers to the induction-passage for water, which enters the cylinder at or near its center, and, after passing inward a short distance, it branches off and extends to the ends of the cylinder, as shown in Fig. 2, where it communicates with the recess or cavity formed in the cylinder-heads.

9 refers to the eduction water-passage through which the water passes from the cylinder.

10 10 refer to the eduction-passages which lead from the main cylinder to the valve chest or cylinder. They communicate with the main cylinder at a point inside of the induction-valve seats, and pass up to and communicate with the recesses in the heads of the valve chest or cylinder in such a manner that, as the piston is moved through the main cylinder and water is forced through such passages, it shall press upon the outer end or ends of valves 6, and force them inward, thus permitting it to pass into chamber 11, and thence out through discharge-aperture 9.

12 refers to an aperture in the upper surface of chest or cylinder 2, which is in communication with chamber 11, and is designed as a part to which to attach an air-chamber, or through which to discharge the water, or for both, as may be desired.

The arrangement of the part composing the pump is such that, upon being placed in the position shown in Fig. 2, and steam being admitted to the left-hand end of the steam-cylinder, the pump-piston will be carried to the right, and the left-hand valve will be pressed inward, and thus the cylinder will be put in communication with the induction-passage, so that water will be forced into and will fill the cylinder. At the same the right-hand valve will be forced against its seat upon the cylinder-head, and all connection with the induction-passage upon that end of the cylinder be cut off, while communication with the eduction-passage 10 will be established, and any water which may have been in the right-hand end of the cylinder will be discharged through such passage.

When the piston arrives at the right-hand end of the cylinder, and upon the change taking place in the position of the steam-valves, it changes its direction of movement, and the positions of the water induction and eduction valves are reversed, and so on for each subsequent stroke of the piston.

I am aware that two valves have been employed in the admission of steam to the cylinder of a pumping-engine, one of which has also been employed as an eduction-valve.

I am also aware that various forms of induction and eduction valves have been used for admitting water to and permitting it to be discharged from pumping-engines, and that both kinds of valves have been operated automatically, and hence I do not claim, broadly, such devices, or the combination of the same independent of their construction; but,

Having thus described my invention, what I claim, and desire to secure by Letters Patent, is—

1. The valve E, constructed with a single aperture or groove upon its face, substantially as and for the purpose set forth.

2. The valve F, constructed with induction-passages J J and eduction-passages J' J', substantially as and for the purpose set forth.

3. The combination and arrangement of the valves E and F, substantially as and for the purpose set forth.

4. The arrangement of the passages I' and J'' in the valve-seat with reference to the passages J' in the valve F, substantially as and for the purpose set forth.

5. The arrangement of the valves E and F with reference to each other, as a consequence of which the induction-passage in valve F is opened twice during each stroke of the main piston, substantially as and for the purpose set forth.

6. In reference to the pump, the construction of the cylinder-heads, when made to extend into the cylinder, and having formed in them chambers for water and valve-seats upon their inner surfaces, substantially as and for the purpose set forth.

7. The induction-valves, when made to slide upon and be guided by the piston-rod, or upon rods secured to the cylinder-heads, substantially as and for the purpose set forth.

8. The arrangement of the eduction-valves with reference to the discharge-passages 9, 10, and 11, substantially as and for the purpose set forth.

In testimony whereof I have signed my name to this specification in the presence of subscribing witnesses.

LOUIS C. RODIER.

Witnesses:
 EDM. F. BROWN,
 B. EDW. J. EILS.